(12) United States Patent
Kleven et al.

(10) Patent No.: US 6,170,338 B1
(45) Date of Patent: *Jan. 9, 2001

(54) VORTEX FLOWMETER WITH SIGNAL PROCESSING

(75) Inventors: Lowell A. Kleven, Eden Prairie; Robert C. Hedtke, Hamburg; David E. Wiklund, Eden Prairie, all of MN (US)

(73) Assignee: Rosemont Inc., Eden Prairie, MN (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/826,167

(22) Filed: Mar. 27, 1997

(51) Int. Cl.$^7$ ........................................ G01F 1/32
(52) U.S. Cl. ........................................ 73/861.22
(58) Field of Search ..................... 73/861.22, 861.23, 73/861.24, 861.25, 861.34

(56) References Cited

U.S. PATENT DOCUMENTS

| | | | |
|---|---|---|---|
| 3,370,463 | 2/1968 | Chanaud | 73/194 |
| 3,638,037 | 1/1972 | McMurtrie | 307/233 |
| 3,709,034 | 1/1973 | Herzl | 73/194 B |
| 3,719,073 | 3/1973 | Mahon | 73/194 B |
| 3,729,995 | 5/1973 | Kovacs et al. | 73/194 B |
| 3,776,033 | 12/1973 | Herzl | 73/194 B |
| 3,864,972 | 2/1975 | Burgess et al. | 73/194 B |
| 3,885,432 | 5/1975 | Berzl | 73/194 B |
| 3,992,939 | 11/1976 | November | 73/194 M |

(List continued on next page.)

FOREIGN PATENT DOCUMENTS

| | | |
|---|---|---|
| 287 995 | 3/1991 | (DE) . |
| 0549945A2 | 7/1993 | (EP) . |
| 0 666 468 | 8/1995 | (EP) . |
| 3-277973 | 12/1991 | (JP) . |
| 5-18798 | 1/1993 | (JP) . |
| WO 90/04230 | 4/1990 | (WO) . |

OTHER PUBLICATIONS

"Isolation Amplifier Based on Sigma Delta Modulation", NASA Tech Briefs, National Aeronautics and Space Administration, Technical Support Package, vol. 18 (7), Jul. 1994.
"Mass Flowmeter Detecting Fluctuations in Lift Generated by Vortex Shedding", I. Itoh et al., Flow Meas. Instrum, vol. 4, No. 4, 1993, pp. 215–223.
Schlichting, H., "Boundary layer theory, 7th edition", 1979, McGraw–Hill, ISBN 0–07–055334–3 XP002076645, pp. 333–335.

Primary Examiner—George Dombroske
Assistant Examiner—Jewel V. Thompson
(74) Attorney, Agent, or Firm—Westman, Champlin & Kelly, PA

(57) ABSTRACT

A vortex sensor senses the generated vortices and provides a vortex signal. A filtering circuit is coupling to the vortex sensor to receive the vortex signal and provide an output indicative of fluid flow. A temperature sensor senses a temperature of the fluid and provides a temperature value, while a pressure sensor senses a pressure of the fluid and provides a pressure value. A processor is operably coupled to the filtering circuit, the temperature sensor, and the pressure sensor for receiving the output, the temperature value, and the pressure value, respectively. The processor calculates a calibration factor as a function of the output, the temperature value, and the pressure value for use in calculating the output value indicative of the flow rate of the fluid.

17 Claims, 7 Drawing Sheets

U.S. PATENT DOCUMENTS

| | | | |
|---|---|---|---|
| 4,010,645 | 3/1977 | Herzl | 73/194 B |
| 4,026,150 | 5/1977 | Schmidt | 73/194 VS |
| 4,048,854 | 9/1977 | Herzl | 73/194 VS |
| 4,094,194 | 6/1978 | Herzl | 73/194 VS |
| 4,142,407 | 3/1979 | Kuroiwa et al. | 73/861.22 |
| 4,169,376 | 10/1979 | Herzl | 73/194 VS |
| 4,270,391 | 6/1981 | Herzl | 73/861.22 |
| 4,285,246 | 8/1981 | Kita | 73/861.03 |
| 4,297,894 | 11/1981 | Nagaishi et al. | 73/861.03 |
| 4,297,898 | 11/1981 | Herzl | 73/861.22 |
| 4,372,169 | 2/1983 | Hughes | 73/861.52 |
| 4,437,350 | 3/1984 | Tamura et al. | 73/861.24 |
| 4,440,027 | 4/1984 | Focht | 73/861.24 |
| 4,448,081 | 5/1984 | Kolitsch et al. | 73/861.03 |
| 4,455,877 | 6/1984 | Blechinger et al. | 73/861.22 |
| 4,459,847 | 7/1984 | Kita | 73/861.22 |
| 4,476,728 | 10/1984 | Otani | 73/861.22 |
| 4,523,477 | 6/1985 | Miller | 73/81.02 |
| 4,545,258 | 10/1985 | Coursolle | 73/861.22 |
| 4,561,310 | 12/1985 | Barnard et al. | 73/861.02 |
| 4,589,279 | 5/1986 | Mitsuyasu et al. | 73/118 |
| 4,605,315 | 8/1986 | Kokoszka et al. | 374/144 |
| 4,630,484 | 12/1986 | Mizuno et al. | 73/861.22 |
| 4,683,760 | 8/1987 | Misumi | 73/861.22 |
| 4,730,500 | 3/1988 | Hughes | 73/861.22 |
| 4,807,481 | 2/1989 | Lew | 73/861.24 |
| 4,815,324 | 3/1989 | Tada et al. | 73/861.22 |
| 4,866,435 | 9/1989 | Frick | 340/870.16 |
| 4,876,897 | 10/1989 | DeCarlo et al. | 73/861.04 |
| 4,879,909 | 11/1989 | Lew | 73/861.24 |
| 4,884,441 | 12/1989 | Lew | 73/195 |
| 4,884,458 | 12/1989 | Lew | 73/861.24 |
| 4,893,035 | 1/1990 | Reynolds et al. | 307/520 |
| 4,896,541 | 1/1990 | Hughes | 73/861.22 |
| 4,911,019 | 3/1990 | Lew | 73/861.24 |
| 4,926,695 | 5/1990 | Kleven et al. | 73/861.24 |
| 4,941,361 | 7/1990 | Lew | 73/861.24 |
| 4,972,723 | 11/1990 | Lew | 73/861.24 |
| 4,973,062 | 11/1990 | Lew | 73/861.24 |
| 4,986,134 | 1/1991 | Lew | 73/861.24 |
| 5,005,426 | 4/1991 | Lew | 73/861.22 |
| 5,060,522 | 10/1991 | Lew | 73/861.02 |
| 5,076,105 | 12/1991 | Lew | 73/861.24 |
| 5,090,251 | 2/1992 | Lew | 73/861.24 |
| 5,095,760 | 3/1992 | Lew | 73/861.24 |
| 5,101,668 | 4/1992 | Lew | 73/861.24 |
| 5,109,704 | 5/1992 | Lew | 73/861.24 |
| 5,121,658 | 6/1992 | Lew | 73/195 |
| 5,127,273 | 7/1992 | Lew | 73/861.24 |
| 5,152,181 | 10/1992 | Lew | 73/861.02 |
| 5,214,965 | 6/1993 | Lew | 73/861.24 |
| 5,220,842 | 6/1993 | Lew | 73/861.24 |
| 5,309,771 | 5/1994 | Lew et al. | 73/861.22 |
| 5,351,556 | 10/1994 | Lew et al. | 73/861.22 |
| 5,372,046 | 12/1994 | Kleven et al. | 73/861.22 |
| 5,429,001 | 7/1995 | Kleven | 73/861.22 |
| 5,435,188 | 7/1995 | Lew et al. | 73/861.22 |
| 5,447,073 | 9/1995 | Kalinoski | 73/861.24 |
| 5,463,904 | 11/1995 | Kalinoski | 73/861.24 |
| 5,477,737 | 12/1995 | Lew | 73/704 |
| 5,493,915 | 2/1996 | Lew et al. | 73/861.24 |
| 5,495,769 | 3/1996 | Broden et al. | 73/718 |
| 5,501,099 | 3/1996 | Whorff | 73/29.01 |
| 5,503,021 | 4/1996 | Lew | 73/661 |

VORTEX FLOWMETER WITH SIGNAL PROCESSING

BACKGROUND OF THE INVENTION

The present invention relates to flowmeters such as vortex shedding meters or swirlmeters which are responsive to a fluid flow.

Flowmeters sense the flow of liquids or gasses in conduits and produce a signal indicative of the flow. Under certain circumstances, the presence of an obstacle known alternatively as a shedding bar, bluff body, or vortex generator, in a flow conduit causes periodic vortices in the flow. The frequency of these vortices is directly proportional to the flow velocity in the flowmeter. The shedding vortices produce an alternating differential pressure across the bluff body at the shedding frequency. This differential pressure is converted to an electrical signal by piezoelectric crystals or other differential pressure devices. The magnitude of the differential pressure or electric signal is proportional to $\rho V^2$, where $\rho$ is the fluid density and V is the fluid velocity. When the ratio of pipe diameter to the size of the bluff body is held constant, the signal magnitude is proportional to $\rho D^2 F^2$, where D is the inside diameter of the metering pipe and F is the shedding frequency. The vortex flowmeter produces pulses having a frequency proportional to the flow rate. In a swirlmeter, the fluid whose flow rate is to be measured is forced to assume a swirl component by means of swirl blades, the arrangement being such that the swirling motion is transformed into precessional movement to produce fluidic pulses which are sensed to yield a signal whose frequency is proportional to flow rate. See e.g., U.S. Pat. Nos. 3,616,693 and 3,719,080 which disclose examples of swirlmeters and are hereby incorporated by reference. As used herein, "vortex flowmeter" shall include both vortex shedding meters and swirlmeters.

The vortex flowmeter is a measurement transmitter that is typically mounted in the field of a process control industry installation where power consumption is a concern. The vortex flowmeter can provide a current output representative of the flow rate, where the magnitude of current varies between 4–20 mA on a current loop. It is also desirable for the vortex flowmeter to be powered completely from the current loop so that additional power sources need not be used. Thus, the vortex flowmeter measurement transmitter should be able to operate with less than 4 mA in order for the transmitter to adhere to this process control industry communication standard.

It is known to incorporate a microprocessor into a vortex flowmeter. The microprocessor receives digital representations of the output signal from the vortex sensor and computes desired output quantities based on parameters of the digital representation. For instance, a vortex flowmeter can calculate the mass flow rate through the pipe or conduit. It is desirable to provide the calculated mass flow rate approximately ten times per second. For each new calculation of the mass flow rate, the microprocessor must perform many mathematical steps wherein each mathematical step requires a number of clock cycles, thus limiting the rate at which calculated mass flow rates can be provided. Although it would be desirable to use a more powerful microprocessor, which could perform further calculations to improve accuracy, the microprocessor would require more power than is available from the 4–20 mA industry standard discussed above.

Nevertheless, there is a continuing need for a vortex flowmeter having improved accuracy. However, sacrifices should not be made in the update rate nor should power consumption exceed the power available from the current loop.

SUMMARY OF THE INVENTION

A vortex sensor senses the generated vortices and provides a vortex signal. A filtering circuit is coupled to the vortex sensor to receive the vortex signal and provide an output indicative of fluid flow. A temperature sensor senses a temperature of the fluid and provides a temperature value, while a pressure sensor senses a pressure of the fluid and provides a pressure value. A processor is operably coupled to the filtering circuit, the temperature sensor, and the pressure sensor for receiving the output, the temperature value, and the pressure value, respectively. The processor calculates a calibration factor as a function of the output, the temperature value, and the pressure value for use in calculating the output value indicative of the flow rate of the fluid.

DETAILED DESCRIPTION OF THE PREFERRED EMBODIMENTS

Figure 1:
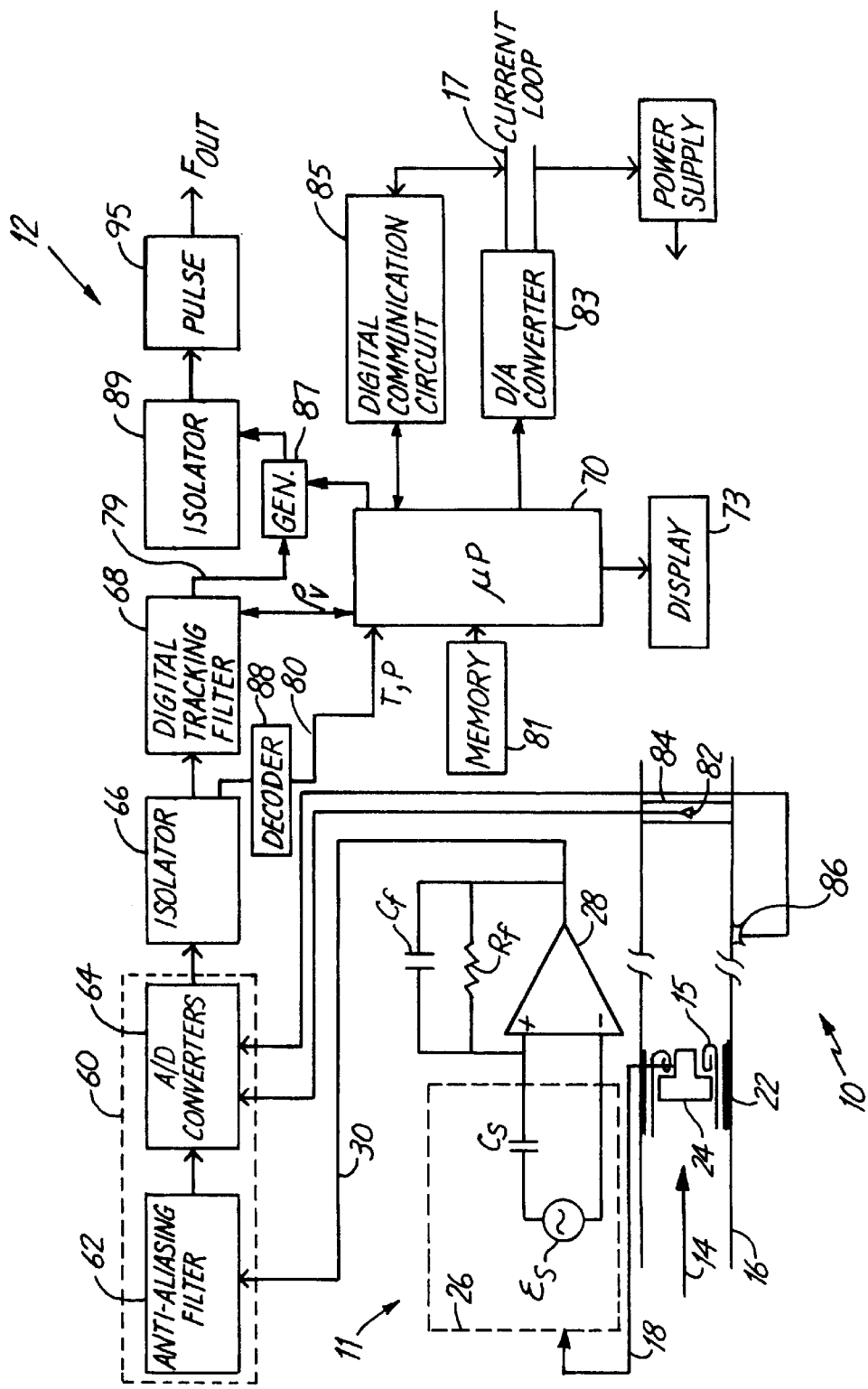
FIG. 1 is a block diagram of a vortex flowmeter in accordance with the present invention.

FIG. 1 illustrates an embodiment of a vortex flowmeter 10 of the present invention. Generally, the vortex flowmeter 10 includes a vortex sensor assembly 11 that includes appropriate mechanical and electrical elements to sense vortices 15 in a fluid 14 that flows through a conduit 16. The vortex sensor 11 is operably coupled to an electronic circuit 12. The electronic circuit 12 produces both a 4–20 mA current on a current loop 17 indicative of flow as well as a square wave output $F_{out}$ having a frequency proportional to fluid flow.

The vortex flowmeter 10 includes a vortex meter housing 22 having a bluff body 24 located therein. When the fluid 14 flows past the bluff body 24, shedding vortices 15 having a frequency indicative of the flow rate are produced. A transducer 26 of the vortex sensor assembly 11, preferably located at the bluff body 24, senses a pressure difference associated with the shedding vortices 15. The vortex sensor 26 can include, for example, a piezoelectric sensor. The sensor 26 has characteristics approximated by a potential source $E_s$ and a series capacitor $C_s$. The magnitude of the output signal from the piezoelectric sensor 26 is proportional to the differential pressure, which is proportional to $\rho V^2$, where $\rho$ is the fluid density and V is the velocity of the fluid 14, and also proportional to $\rho D^2 F^2$, where D is the inside diameter of the meter housing 22 and F is the shedding frequency of the vortices 15.

The output of the transducer 26 is coupled to an amplifier 28 which includes capacitor $C_F$ and a resistor $R_F$. The amplifier 28 provides an analog output signal on line 30. The signal on line 30 is provided to input circuitry 60 including an anti-aliasing filter 62 and an analog-digital (sigma-delta) converter indicated at 64. The anti-aliasing filter 62 filters the signal from line 30 to remove unwanted high-frequency noise and performs anti-aliasing filtering.

The analog-digital converter 64 samples the signal from filter 62 at approximately 307.2 kHz and outputs a single bit datastream at 307.2 kHz which is indicative of the amplitude and frequency of the vortices 15. There are no word boundaries in the datastream. The relative number of ones and zeros, sometimes called the bit density, is representative of the signal on line 30. The analog-digital converter 64, which is preferably implemented in a CMOS ASIC to minimize power, cost, and size, is particularly suited to digitizing analog signals in the 1 to 10 kHz range, which is a typical frequency range for vortex flowmeters. The digital datastream is transmitted across an electrical isolation barrier 66 required for sensors which are grounded or have leakage current to ground. Such sensors are typically used in vortex flowmeters to reduce cost and simplify connections. The single bit datastream enables an inexpensive, compact transformer or capacitor to be used in the isolation barrier 66. Other isolation media are acceptable such as optical, piezoelectric/acoustic and magnetostrictive isolation means.

The single bit datastream is provided through the isolation barrier 66 to a digital tracking filter 68. The digital tracking filter 68 minimizes frequency quantization noise present in the analog-digital converter 64, and also converts the amplitude and frequency vortex sensor signal on line 30 into a flowmeter output indicative of mass flow. The digital filter 68 receives a noise-contaminated input signal related to flow having a fundamental frequency varying responsively to flow. The digital filter 68 filters the input signal with high pass (HP) filter characteristics and preset low pass (LP) filters to produce a filtered signal representative of flow. The frequency characteristic of the HP filter is selected from a family of preselected HP filters having different corner frequencies. In a preferred embodiment, multiple HP filters are used. A microprocessor 70 selects appropriate corner frequencies of the digital filter 68 or suitable control is provided in the digital filter 68 to select the corner frequencies. The digital filter 68 provides a signal related to the amplitude of the signal on line 30 and, which is roughly proportional to the density, $\rho_V$, of the fluid. The signal $\rho_V$ in turn is used to calculate the mass flow rate M. The $\rho_V$ signal is preferred over another signal $\rho V$ also available from the digital filter 68 because the digital filter 68 has removed more noise from the $\rho_V$ signal. U.S. Pat. No. 5,429,001 assigned to the same assignee as the present application, and which is hereby incorporated by reference, describes in detail operation of the digital filter 68 to provide the $\rho_V$ signal. Co-pending application entitled "RAPID TRANSFER FUNCTION DETERMINATION FOR A TRACKING FILTER" filed on the same date as the present application, and which is also hereby incorporated by reference, discloses an alternative digital tracking filter. However, an error of approximately 5% compared to actual fluid density can exist in the $\rho_V$ signal obtained from either of these digital tracking filters. This error is attributable to the fluid effects on the bluff body 24.

In one aspect of the present invention, the vortex flowmeter 10 improves the accuracy of the output value indicative of flow rate, typically mass flow rate M, by monitoring additional parameters of the fluid 14 flowing in the conduit 16 and using the additional parameters to calculate the desired output value indicative of the flow rate. In the embodiment illustrated, the temperature and the pressure of the fluid 14 flowing in the conduit 16 are measured and provided as an input 80 to the microprocessor 70. The temperature is measured with a suitable temperature sensor 82 such as an RTD (resistive temperature device) or a thermocouple that senses a temperature of the fluid 14, preferably downstream from the bluff body 24. In the embodiment illustrated, the temperature sensor 82 is disposed in a streamlined body 84 such as an airfoil for ruggedness and to minimize pressure drop along conduit 16. A suitable pressure sensor 86 senses the line pressure of the fluid in the conduit 16. The temperature sensor 82 and the pressure sensor 86 provide output signals to suitable analog-digital converters indicated at 64 (filtering can be provided if necessary). The analog-digital converters 64 transmit corresponding digital signals across the isolation barrier 66 to a decoder 88 that, in turn, provides the signal 80 to the microprocessor 70. In the embodiment illustrated, both the temperature sensor 82 and the pressure sensor 86 are located downstream from the bluff body 24 to avoid disturbing the generation of vortices 15. In a preferred embodiment, the temperature sensor 82 is located approximately six times the inside diameter of the meter housing 22 from the bluff body 24, while the pressure sensor 86 is located approximately four times the inside diameter of the meter housing 22 from the bluff body 24. At these locations, output values obtained from the temperature sensor 82 and the pressure sensor 86 have negligible errors and can be used to calculate fluid density $\rho_V$.

Figure 2:
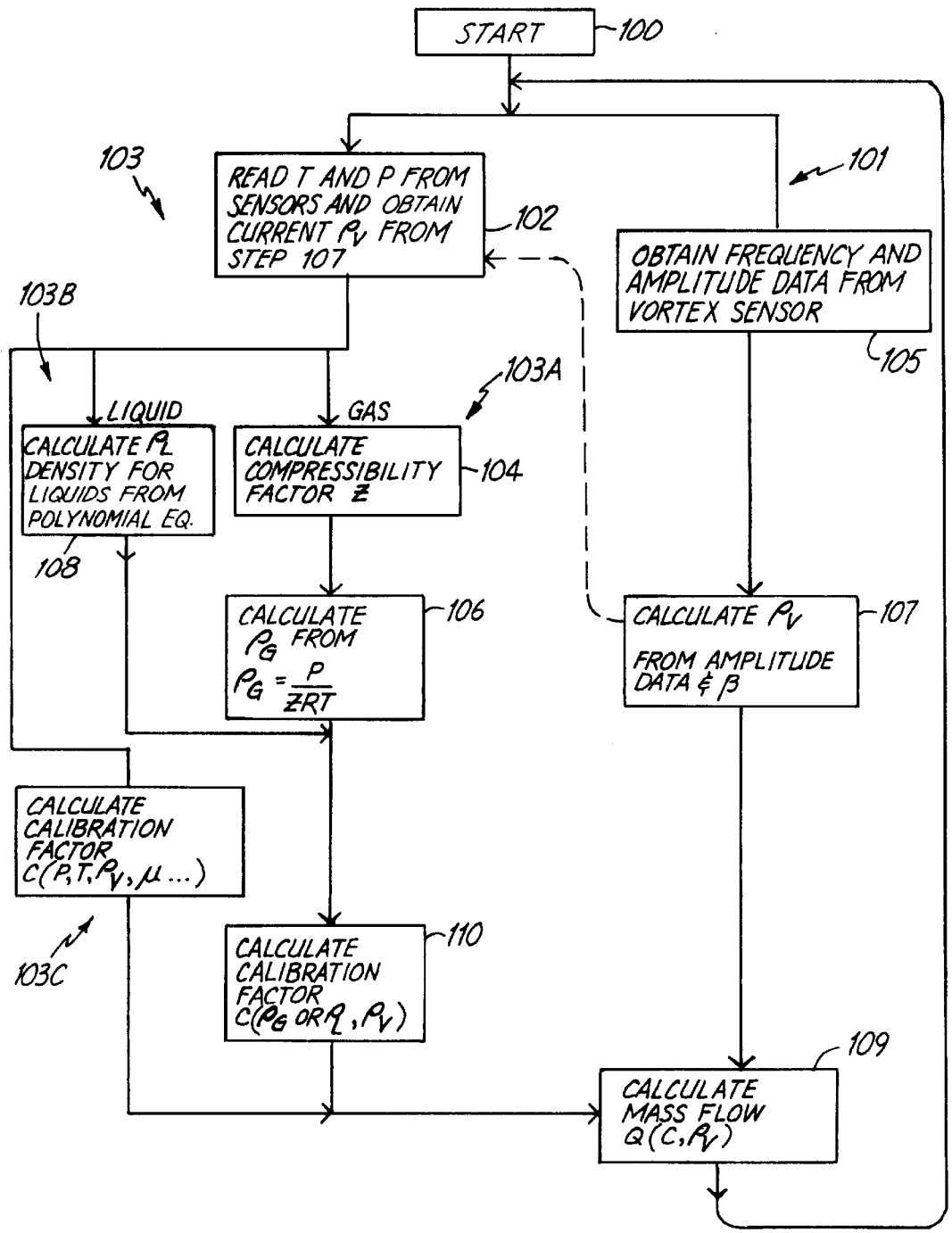
FIG. 2 is a flow chart illustrating operation of the vortex flowmeter of the present invention.

FIG. 2 illustrates a flow chart depicting overall operation of the vortex flowmeter 10. The flow chart begins at step 100. From step 100, program flow can be considered as operating along parallel paths indicated at 101 and 103. In practice, the vortex flowmeter 10 executes operational steps in path 101 and performs successive iterations through path 101 before completing a single iteration through path 103. Specifically, the microprocessor 70 will execute operational steps in path 103 in the "background" wherein these steps, or portions thereof, are completed when time is available during or at the completion of the operational steps of path 101. As will be described below, the operational steps of path 101 provide, as a result, the desired output value indicative of flow, herein the mass flow rate M of the fluid 14 in the conduit 16. However, during normal operation of the vortex flowmeter 10, the accuracy of the calculated mass flow rate M is improved by correcting for temperature and pressure of the fluid 14 through the operational steps of path 103.

Referring first to path 101, at step 105, the vortex flowmeter 10 obtains the frequency and amplitude data from the vortex sensor 11, providing that data to the digital tracking filter 68 as described above. The digital tracking filter 68 then provides, at step 107, the density $\rho_V$, which is indicative of the flow of the fluid 14 in the conduit 16. Calculations performed at step 107 include applying a stored scaling constant, $\beta$, to account for differences in the sensitivity of the vortex sensor 11 and electronics 12, which can vary from element to element for a given line size, for example, ±30% from nominal. Preferably, $\beta$ is adjusted such that $\rho_V$ substantially corresponds to $\rho_G$ or $\rho_L$ from step 110 discussed below (i.e. C is approximately equal to one). The density value $\rho_V$ is then used by the microprocessor 70 in accordance with known equations to calculate the mass flow rate M (similar to that described in U.S. Pat. No. 5,429,001) at step 109. However, in this embodiment of the vortex flowmeter 10 of the present invention, the density value $\rho_V$ is corrected with a calibration factor C that is calculated from the operational steps of path 103. Since the calibration factor C can be dependent upon at least one value of the density $\rho_V$, and since the calibration factor C may not have been calculated for the first iteration along path 101, the calibration factor C can be initially set to one.

Referring now to path 103, the microprocessor 70 reads at step 102 fluid parameters, such as temperature and pressure from line 80 and obtains a $\rho_V$ that was calculated at 107 and that corresponds in time with the measured temperature and pressure. At this point, program flow will traverse subpaths 103A, 103B, or 103C depending on whether the fluid is a gas or liquid, or whether little or any properties of the fluid is known.

Figure 3A:
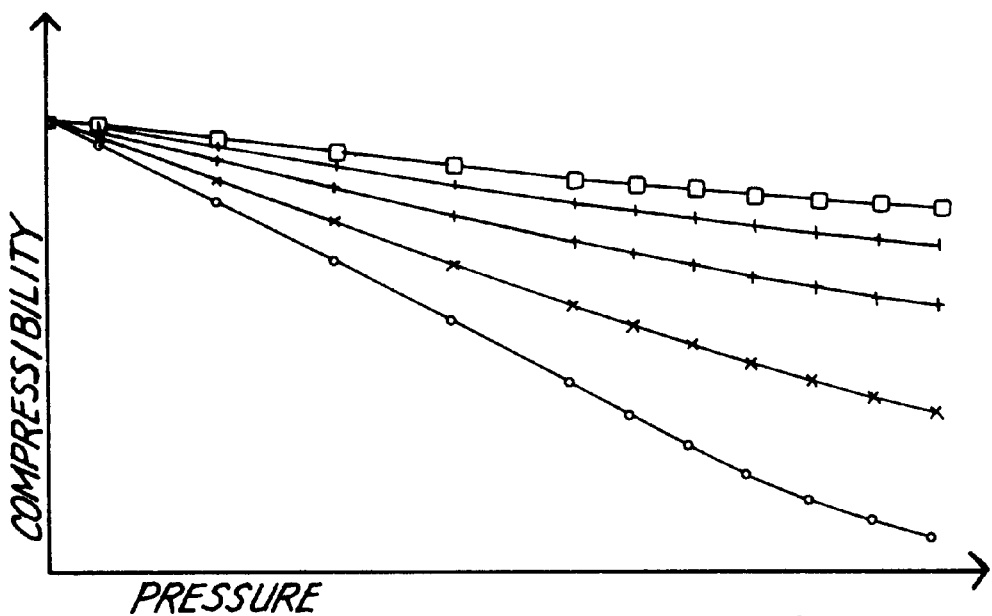
FIGS. 3A and 3B are curves of the compressibility factor as a function of pressure at various temperatures for two fluids.
Figure 3B:
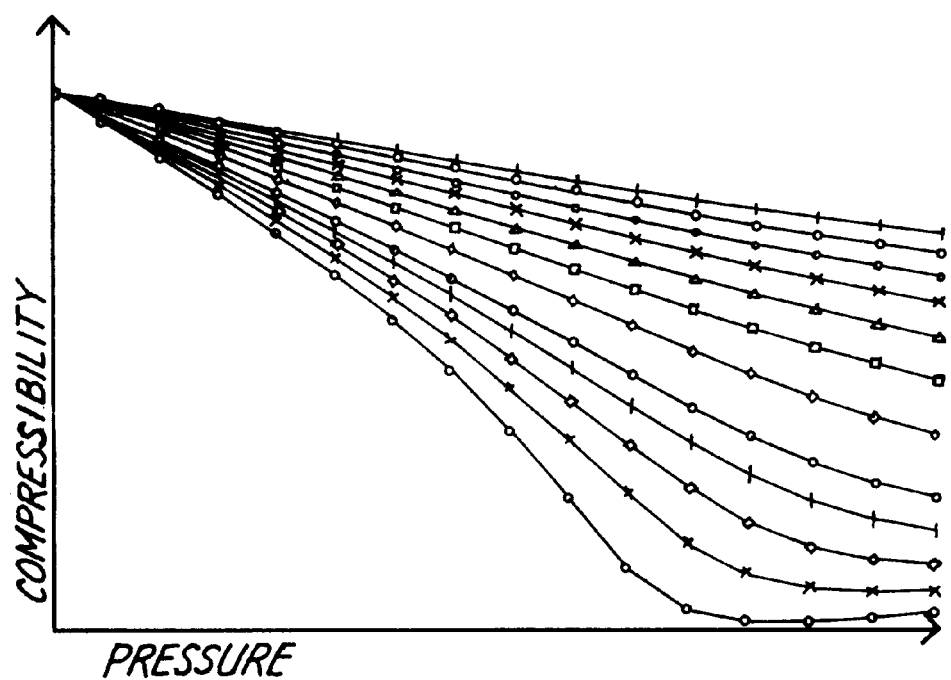

If the fluid is a gas, program flow continues along path 103A. At step 104, the microprocessor 70 calculates a compressibility factor, Z, of the fluid 14 flowing in the conduit 16. There are a number of standards for calculating compressibility factors which have been promulgated by a number of organizations such as the American Gas Association. FIGS. 3A and 3B are representative of the variation in the compressibility factor as a function of pressure at various temperatures for gasses having different constituents. Microprocessor 70 preferably calculates the compressibility factor using stored coefficients associated with a particular fluid. Since one set of coefficients is required for each of a plurality of fluids contemplated, and because the magnitude of the compressibility factor varies significantly, it is preferable to use polynomials of the form:

$$\frac{1}{Z} = \sum_i \sum_j A_{ij} \frac{P^i}{T^j} \quad (1)$$

where $A_{ij}$ is a curve fitting derived constant stored in memory (EEPROM) 81, T is the process absolute temperature and P is the absolute pressure, and where i and j preferably take on integer values between 0 and 9, depending on the accuracy required to calculate the compressibility factor. A 63 term polynomial (i=0 to 8, j=0 to 6) suffices for most applications. Polynomials of this form and number of terms reduce the amount of computation over direct calculation methods, thereby reducing the time between updates of the calibration factor C and the operating power requirements of vortex flowmeter 10. Moreover, such a technique obviates a large memory to store many numbers of auxiliary constants, again saving power.

After the compressibility factor, Z, has been calculated at step 104, this value is used at step 106 to calculate a density value $\rho_G$ according to the ideal gas law.

If the fluid 14 is a liquid, after step 102, program flow continues along a path 103B. The path 103B includes a step 108 where the density $\rho_L$ for the liquid is calculated. The microprocessor 70 preferably calculates $\rho_L$ using stored polynomials of the form:

$$\rho_L = \sum_k \sum_l B_{kl} \frac{P^k}{T^l} \quad (2)$$

where $B_{kl}$ is a curve fitting derived constant stored in memory 81, T is the process absolute temperature and P is the absolute pressure, and where k and l can take on appropriate integer values depending on desired accuracy. If desired, since liquids are substantially incompressible, the term $P^k$ can be omitted.

A calibration factor, C, is calculated at step 110 as a function of $\rho_G$ or $\rho_L$, and $\rho_V$. The calibration factor, C, can be a simple ratio obtained from these values, or, in the alternative, can be a rolling average or a time weighted average.

Subpath 103C represents calculation of a calibration factor C wherein little, if any, is known of the fluid properties of the fluid flowing through the conduit 16. Generally, the calibration factor can be expressed as:

$$C = C_{ref} + \Delta C \quad (3)$$

where $C_{ref}$ is an average value of the calibration factor and wherein $\Delta C$ is a small value calculated as a function of available parameters such as the pressure from the pressure sensor 86, the temperature as measured from the temperature sensor 82, $\rho_V$ as calculated at step 107, or any other known parameters of the fluid, for example, the dynamic viscosity. For instance, the microprocessor 70 can calculate a calibration factor for changes of the vortex sensor assembly 11 output in stiffness or elasticity as a function of pressure and temperature. In a further embodiment, the microprocessor 70 can calculate a Reynold's Number using $\rho_V$, the velocity of the flowing fluid V (obtained from the shedding frequency), the diameter of the meter and the dynamic viscosity $\mu$, which is a function of temperature and fluid type. Although calculation of the Reynold's Number requires knowing the dynamic viscosity of the fluid, an approximation can be used. The dynamic viscosity can simply be a constant (ignoring any temperature effects) or can also be as a function of temperature of the form:

$$\frac{1}{\mu} = \sum_n \frac{D_n}{T^n} \quad (4)$$

depending on the extent of knowledge of the fluid properties wherein $D_n$, is curve fitting derived constant, T is the process absolute temperature and n can take on an appropriate integer value, depending on desired accuracy. Knowing the Reynold's Number, the microprocessor 70 can correct the "K Factor" and/or a coefficient of pressure on the bluff body 24 that determines differential pressure ($\Delta P = C_P \rho V^2$). If desired, the microprocessor 70 calculates the calibration factor C using stored polynomials of the form:

$$C = \sum_r \sum_s C_{rs} \Delta P^r \Delta T^s \quad (5)$$

where $C_{rs}$ is a curve fitting derived constant stored in memory 81, $\Delta T$ is the difference between the actual temperature from a reference temperature and $\Delta P$ is the difference between the actual pressure and a reference pressure, and where r and s can take on appropriate integer values, depending on desired accuracy. If desired, values for $\rho_V$, $\mu$, mach number or other known characteristics or measured fluid parameters can also be incorporated in this equation.

Once the calibration factor C has been calculated it is then used in step 109 for successive iterations of path 101 until a new calibration factor is again calculated in the background during the successive iterations. The microprocessor 70 provides the final output value to a digital-analog converter 83 for converting the digital value to a 4–20 mA current representative of the flow. A digital communications circuit 85 also can receive the final output value for transmission on the current loop 17 using known formats. If desired, a generator 87 can also receive the final output value of mass flow and through an isolator 89 provide a frequency output $F_{out}$ from a pulse circuit 95. Otherwise, the generator 87 can receive a signal 79 indicative of volumetric flow from the digital tracking filter 68. The microprocessor 70 provides suitable scaling constants to the generator 87 when $F_{out}$ is indicative of volumetric flow. A display 73 provides a user interface for the vortex flowmeter 10.

In this manner, the single microprocessor 70 can be used for all processing thereby minimizing the power consumed by the vortex flowmeter 10, allowing it to be completely powered from the current loop 17. Although steps in path 103 require additional processor time, these calculations can be performed by the microprocessor 70, while still providing the desired update rate for the mass flow rate M. This would not be possible if the microprocessor 70 had to calculate the mass flow signal M solely from the density value $\rho_L$ or $\rho_G$. Under those circumstances, either the update rate of the microprocessor 70 would have to be reduced to stay within available power limits from the current loop 17, or additional power would have to be provided. In the preferred embodiment, the update rate is maintained without exceeding the available power budget because steps in path 103 are performed at a rate less than the update rate of the mass flow rate M.

Figure 1A:
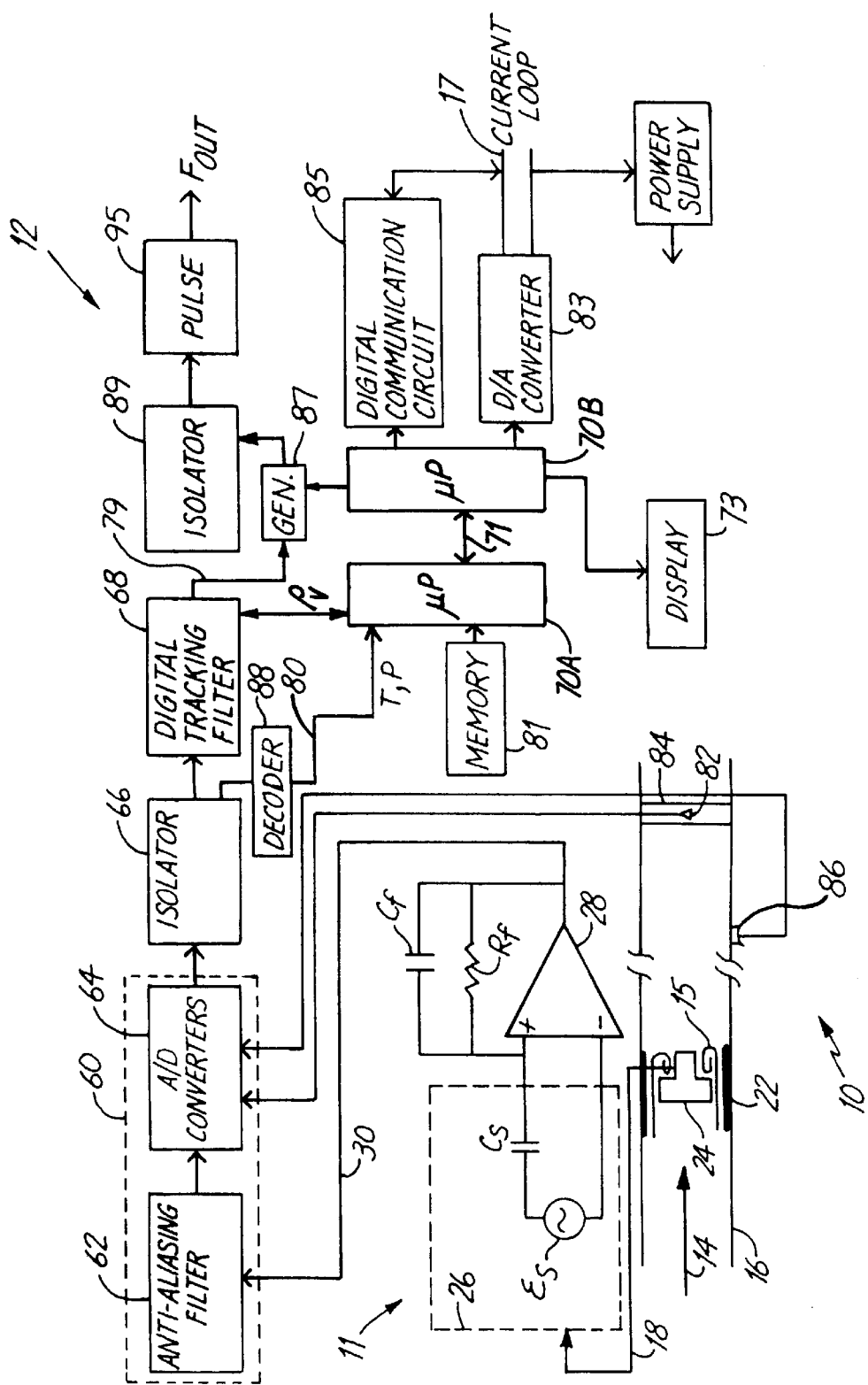
FIG. 1A is a block diagram of a second embodiment of a vortex flowmeter in accordance with the present invention.

FIG. 1A illustrates an exemplary embodiment having two microprocessors 70A and 70B. The microprocessor 70A calculates the mass flow rate M pursuant to the flow chart of FIG. 2. as described above. The microprocessor 709 communicates with the microprocessor 70A through a data bus 71. The microprocessor 70B controls the generator 87 and the display 73, and communicates over the current loop 17 with a remote location, not shown, through the digital-analog converter 83 and the digital communications circuit 85. FIG. 1A illustrates one embodiment where multiple microprocessors 70A and 70B are used to perform operational tasks. Embodiments having more than two microprocessors, or where the operational tasks have been delegated differently are also within the scope of the present invention.

Another aspect of the present invention includes calculating additional corrections or providing alarms for volumetric as well as mass flow for both liquids and gasses using the measured pressure and/or temperature. For example, temperature compensation for the "K factor" (ratio of vortex shedding frequency to volumetric flow rate) due to thermal expansion of the meter housing 22 can be provided. As an example, if the meter housing 22 is made from stainless steel, temperature compensation for K factor due to thermal expansion is approximately 0.3%/100° F. Flowmeter 10 would store both a nominal K factor and a correction factor based on the thermal expansion coefficient and the measured temperature. The microprocessor 70 would then use both the nominal K factor and the correction factor to calculate output flow value.

Another correction includes calculation of pressure and temperature changes in viscosity of the fluid 14 to determine a Reynold's Number correction to the K factor. This correction is particularly useful for higher viscosity liquids flowing at low flow rates in small conduits. Hence, both a nominal Reynold's Number and a correction factor (based on temperature, pressure, and fluid type) would be stored and used by flowmeter 10.

In yet another embodiment, an alarm is provided when incipient cavitation is present in the vortex sensor 11. Incipient cavitation results when the pressure of the fluid 14 is near or below the vapor pressure of the fluid. The following equation represents the minimal allowable line pressure, $P_L$, five diameters downstream from the meter 22:

$$P_L = A\Delta P + BP_{VAP} \qquad (6)$$

where $\Delta P$ equals the upstream to downstream pressure drop across the bluff body 24 ($\Delta \rho = C_X \rho V^2$, where $C_X$ is a proportionability constant), A is a constant associated with a localized minimum pressure point on the bluff body 24, $P_{VAP}$ is the vapor pressure of the fluid 14 stored as an equation or as a table in memory 81, and B is a constant indicating a threshold margin near the vapor pressure. For instance, constant A can have a value approximately equal to 2.9 (at five diameters downstream), while constant B can have a value approximately equal to 1.3. Constants A and B may vary depending on the actual location of the measured pressure. Preferably, the microprocessor 70 performs this calculation when the amplitude signal from vortex sensor 11 drops below expected values. If the microprocessor 70 calculates that the line pressure of fluid 14 is approaching the vapor pressure, an alarm can be provided over line 17 or at the display 73 indicating cavitation. Otherwise, an alarm can be provided indicating an error in the vortex flowmeter 10.

In another embodiment, the microprocessor 70 uses the measured pressure and temperature data to calculate if condensation is occurring in the gasses flowing through the vortex flowmeter 10. In such a situation, the microprocessor 70 can provide an alarm indicating operation in the gas condensation region.

In an embodiment for a steam application, the microprocessor 70 calculates the quality of steam by comparing the density value $\rho_G$ from the measured pressure and temperature data to the density value $\rho_V$ obtained from amplitude measurements. The microprocessor 70 provides a signal indicative of steam quality over the current loop 17 to the remote location.

In yet another embodiment, microprocessor 70 calculates the dynamic pressure on the bluff body 24 from the density $\rho_L$ or $\rho_G$ and the fluid flow rate, or such amplitude can be inferred from the output from sensor 11. If the dynamic pressure exceeds a predetermined value dependent on a maximum allowable value beyond which fatigue and/or structural damage can occur to the bluff body 24 or the sensor 11, the microprocessor 70 can provide an alarm signal on line 17.

In a further embodiment, the microprocessor 70 compares the values of $\rho_V$ with $\rho_L$ or $\rho_G$ and provides an alarm if a difference between these values exceeds a preselected threshold to indicate failure or degradation of sensor 11 or electronics 12. In addition, the microprocessor 70 can monitor the signals obtained from the temperature sensor 82 and the pressure sensor 86 to ascertain if the signals are outside of usable ranges. If either of these signals are outside the usable range, the microprocessor 70 can stop calculating the calibration factor because values obtained may be in error. In this situation, the microprocessor 70 can provide an alarm indicating that mass flow is only being calculated via path 101 wherein the calibration factor C has been set to a default value such as one or the last usable value. Likewise, the microprocessor 70 can monitor the $\rho_V$ signal from the digital filter 68 and calculate the mass flow based only values of $\rho_G$ or $\rho_L$ if the signal of $\rho_V$ appears to be in error. The microprocessor 70 can provide a different alarm if the values $\rho_G$ or $\rho_L$ are only being used.

Each of the foregoing calculations would require additional processor time from the microprocessor 70 and may be accomplished only with a slower update rate on the calculated corrections and/or alarms because of the multi-tasking of the microprocessor 70. Generally, these corrections are small and would not need updating faster than a 10 to 20 second rate. If desired, an integer multiply function can be provided in the ASIC to assist in these calculations, particularly if the update rates of the correction calculations exceed 20 to 30 seconds. Also, with the integer multiply function in the ASIC, the pressure and temperature values can be corrected for linearity, zero offsets and temperature offset compensation.

In another embodiment, data from the temperature sensor 82 and the pressure sensor 86 can be used to calibrate a new vortex sensor 11 in the event the vortex sensor 11 needs to be replaced. Specifically, if the vortex sensor 11 is replaced, the microprocessor 70 compares the value of $\rho_V$ with either values from $\rho_G$ or $\rho_L$ and adjusts the scaling constant $\beta$ in memory 81 that equates $\rho_G$ or $\rho_L$ to $\rho_V$ so that C remains substantially equal to one. The microprocessor 70 has then calibrated the new vortex sensor 11 and operation continues pursuant to FIG. 2.

Figures 4, 5:
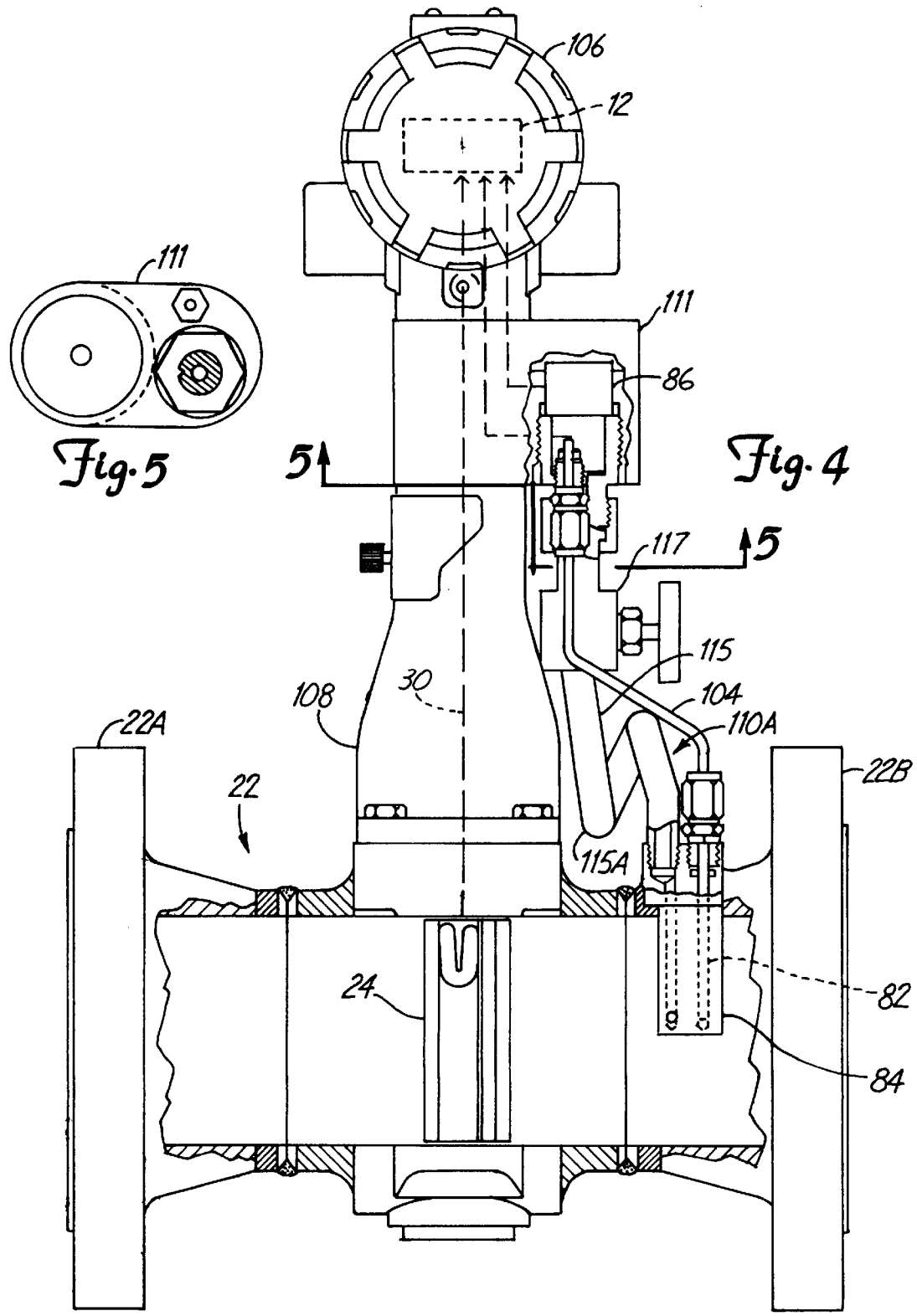
FIG. 4 is a side elevational view of the vortex flowmeter with portions removed.
FIG. 5 is a sectional view of the vortex flowmeter taken along lines 5—5 of FIG. 4.
Figure 6:
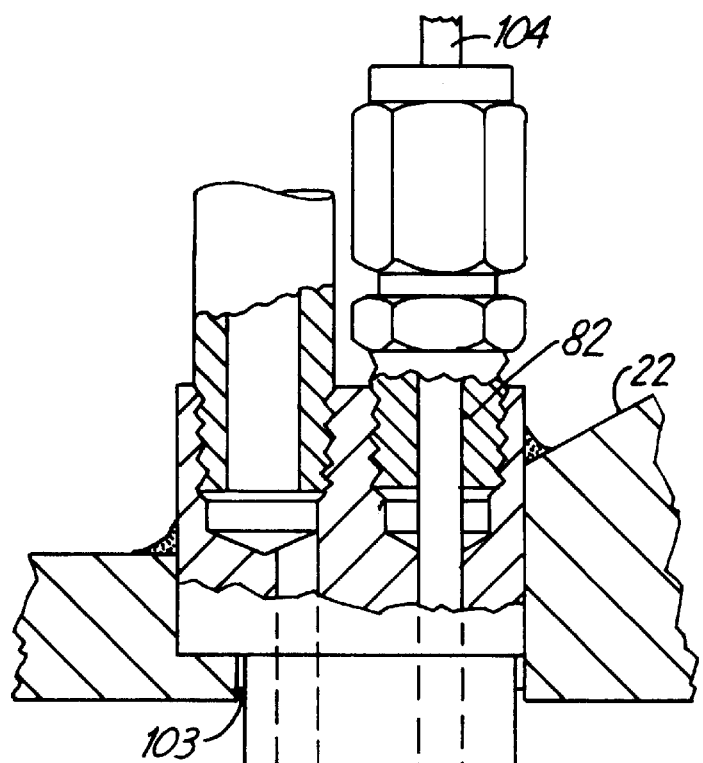
FIG. 6 is an enlarged sectional view of a portion of FIG. 4.
Figure 7:
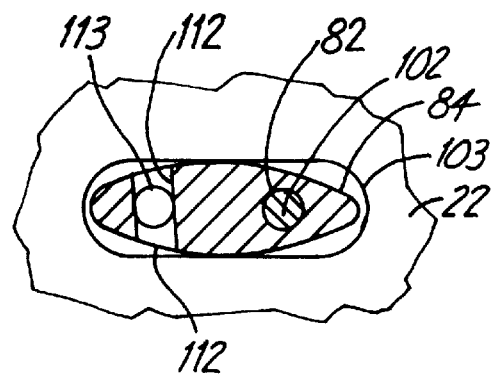
FIG. 7 is a sectional view taken along lines 7—7 in FIG. 6.

In an alternative embodiment illustrated in FIGS. 4–7, the temperature sensor 82 and the pressure sensor 86 are mounted to the meter housing 22 between connecting flanges 22A and 22B. The temperature sensor 82 is mounted in the streamlined body 84 located downstream from the bluff body 24. The streamlined body 84 is also illustrated in FIGS. 6-7 and includes an inner recess 102 for receiving the temperature sensor 82, for example, a type-N thermocouple, mounted therein. The streamlined body 84 mounts to the meter housing 22 and extends through a recess 103. Referring also back to FIG. 4, a signal line 104 connects the temperature sensor 82 to the electronics 12 located in a transmitter housing 106.

In this embodiment, a support tube 108 supports the transmitter housing 106 on the meter housing 22. The pressure sensor 86 is disposed in a connecting module 111 between the support tube 108 and the transmitter housing 106. Fluid pressure is provided to the pressure sensor 86 through a passageway 110A having at least one port 112 opening to the fluid 14 between the flanges 22A and 22B. In the embodiment illustrated, the ports 112 are located in the streamlined body 84. The passageway 110A includes an inner bore 113 and a tube 115. Preferably, the tube 115 includes a loop 115A for a condensation trap. A valve 117 is provided in the passageway 110A to allow replacement of the pressure sensor 86 in the field.

Figure 8:
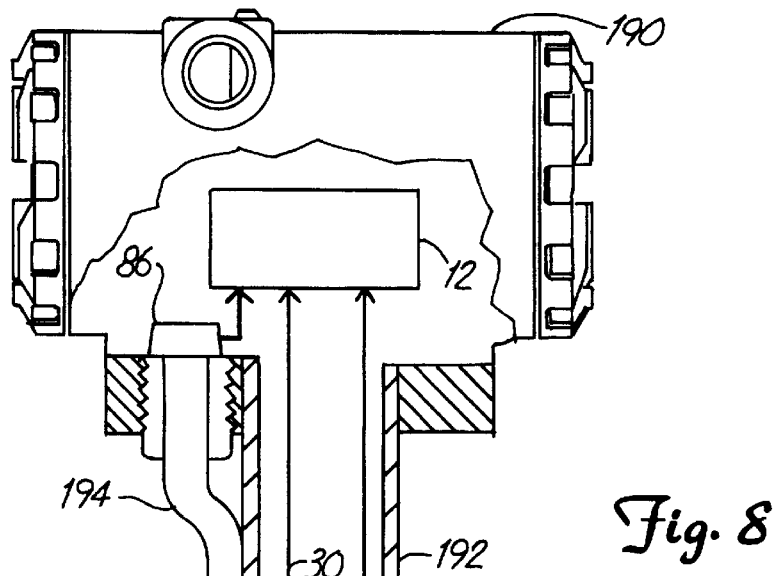
FIG. 8 is a side elevational view of a second embodiment of the vortex flowmeter with portions removed.
Figure 9:
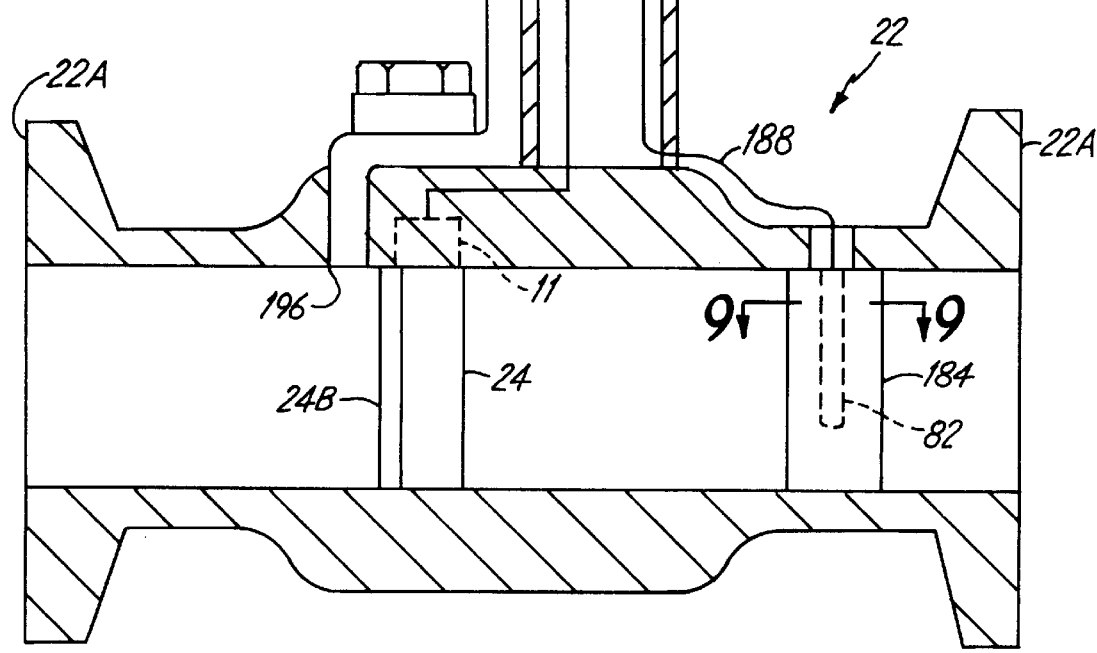
FIG. 9 is a sectional view of the vortex flowmeter taken along lines 9—9 of FIG. 8.
Figure 9:
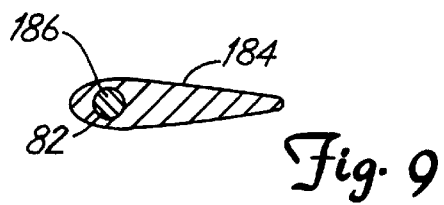

In yet another embodiment illustrated in FIGS. 8 and 9, the temperature sensor 82 and the pressure sensor 86 are mounted to the meter housing 22 between connecting flanges 22A and 22B. The temperature sensor 82 is mounted in a streamlined body 184 located downstream from the bluff body 24. The streamlined body 184 is also illustrated in FIG. 5 and includes an inner recess 186 for receiving the temperature sensor 82, for example, a type-N thermocouple, mounted therein. Referring also back to FIG. 8, a signal line 188 connects the temperature sensor 82 to the electronics 12 located in a transmitter housing 190.

In this embodiment, a support tube 192 supports the transmitter housing 190 on the meter housing 22. The pressure sensor 86 is disposed in the transmitter housing 190. Fluid pressure is provided to the pressure sensor 86 through a passageway 194 having a port 196 through the meter housing 22 and opening to the fluid 14 between the flanges 22A and 22B. In the embodiment illustrated, the pressure port 196 is positioned proximate the bluff body 24, in the embodiment illustrated upstream thereof.

The location of ports 112 and temperature sensor 82 in FIGS. 4–7, the port 196 and temperature sensor 82 in FIGS. 8 and 9, and other convenient locations in the meter housing 22 for obtaining the temperature and pressure of the fluid can include corrections due to the dynamic pressure head (proportional to $\rho V^2$) and temperature recovery factor:

$$\Delta T = \frac{rV^2}{2C_S} \quad (7)$$

where $C_s$ is the specific heat at constant pressure and r is a recovery factor). The microprocessor 70 uses the measured pressure and temperature in the meter housing 22, the measured density $\rho_V$ and calculated density $\rho_G$ or $\rho_L$, in appropriate thermodynamic, energy and momentum equations to correct for errors due to measurement locations. For instance, pressure in front of the bluff body 24 is related to the pressure at four diameters downstream from the bluff body 24 by the following equation:

$$P - P_{4D} = C_P \rho V^2 \quad (8)$$

where P is the pressure ahead of the bluff body 24, $P_{4D}$ is the pressure four diameters downstream from the bluff body 24, $C_P$ is a pressure loss coefficient that varies with Reynold's Number, $\rho$ is the density of the fluid and V is the velocity of the fluid. Measurement locations between the mounting flanges 22A can provide better mechanical arrangements for the meter housing 22, less sensitivity to location errors, less conduction errors on the temperature sensor, reduced interference with vortex shedding frequency, and reduced plugging of pressure ports. In this manner, the vortex flowmeter 10 can be assembled entirely at the factory, reducing the overall size and cost of the flowmeter 10, and making installation easier since additional penetration points in the conduit are not needed.

Although the present invention has been described with reference to preferred embodiments, workers skilled in the art will recognize that changes may be made in form and detail without departing from the spirit and scope of the invention.

What is claimed is:

1. A vortex flowmeter, comprising:
   a flowtube having a vortex generator and streamlined body disposed therein;
   a vortex sensor that detects vortices generated by the vortex generator;
   a temperature sensor disposed at the streamlined body to measure a temperature of fluid carried by the flowtube; and
   a circuit coupled to the vortex sensor and to the temperature sensor to provide an output indicative of fluid flow.

2. The vortex flowmeter of claim 1, further comprising:
   a pressure sensor coupled to the circuit and disposed in the flowtube to measure a pressure of fluid carried by the flowtube;
   wherein the circuit also couples to the pressure sensor.

3. The vortex flowmeter of claim 2, wherein the pressure sensor couples to a pressure port provided in the flowtube, and wherein the circuit calculates a correction factor as a function of the position of the pressure port in the flowtube.

4. The vortex flowmeter of claim 2 wherein the pressure sensor couples to a pressure port provided in the streamlined body.

5. The vortex flowmeter of claim 1, wherein the streamlined body is disposed downstream of the vortex generator.

6. A vortex flowmeter providing an output value representative of a flow rate of a fluid, the vortex flowmeter comprising:
a vortex generator positionable in the fluid;
a vortex sensor that provides a vortex signal as a function of generated vortices;
a filtering circuit coupled to the vortex sensor to receive the vortex signal and provide a filter output indicative of fluid flow;
a temperature sensor sensing a temperature of the fluid and providing a temperature value;
a processor operably coupled to the filtering circuit and the temperature sensor to receive the filter output and the temperature value respectively, the processor calculating a calibration factor as a function of the filter output and the temperature value, and calculating the output value as a function of the calibration factor.

7. The vortex flowmeter of claim 6, wherein the output value is representative of a mass flow rate of the fluid.

8. The vortex flowmeter of claim 6, wherein the processor calculates the output value at a selected update rate, and wherein the processor calculates the calibration factor at a second rate less than the selected update rate.

9. The vortex flowmeter of claim 6 and further comprising a pressure sensor for sensing a pressure of the fluid and providing a pressure value, the processor operably coupled to the pressure sensor to receive the pressure value and calculate the calibration factor as a function of the pressure value.

10. The vortex flowmeter of claim 9 wherein the calibration factor is a function of compressibility of the fluid and the processor further calculates the compressibility according to an equation generally of the form:

$$\frac{1}{Z} = \sum_i \sum_j A_{ij} \frac{P^i}{T^j}$$

where $A_{ij}$ is a curve fitting derived constant, T is the fluid temperature and P is the fluid pressure, and where i and j take on integer values.

11. A vortex flowmeter providing an output value representative of a flow rate of a fluid, the vortex flowmeter comprising:
a vortex generator positionable in the fluid;
a vortex sensor that provides a vortex signal as a function of generated vortices;
a filtering circuit coupled to the vortex sensor to receive the vortex signal and provide a filter output indicative of fluid flow;
a temperature sensor sensing a temperature of the fluid and providing a temperature value;
a pressure sensor for sensing a pressure of the fluid and providing a pressure value; and
a processor operably coupled to the filtering circuit, the temperature sensor and the pressure sensor to receive the filter output, the temperature value and the pressure value, respectively, the processor calculating a scaling constant as a function of the temperature value and the pressure value for applying to the filter output.

12. A flowmeter that measures a mass flow rate of a fluid, comprising:
a volumetric flow sensor having a volumetric output that varies as a function of a volumetric flow rate of the fluid;
a streamlined body disposed in the fluid;
a temperature sensor disposed at the streamlined body and having a temperature output; and
a circuit receiving the volumetric output and the temperature output and providing as a function thereof a flowmeter output representative of the mass flow rate of the fluid.

13. The flowmeter of claim 12, wherein the streamlined body comprises an airfoil.

14. The flowmeter of claim 12, wherein the circuit applies a correction factor to the temperature output before calculating the flowmeter output.

15. The flowmeter of claim 12, wherein the volumetric flow sensor includes a vortex generator.

16. The flowmeter of claim 12, further comprising a pressure sensor operably coupled to the fluid to provide a pressure output, wherein the circuit also receives the pressure output.

17. The flowmeter of claim 16, wherein the streamlined body has a pressure port and the pressure sensor couples to the pressure port.

* * * * *

UNITED STATES PATENT AND TRADEMARK OFFICE
CERTIFICATE OF CORRECTION

PATENT NO. : 6,170,338 B1
DATED : January 9, 2001
INVENTOR(S) : Kleven et al.

It is certified that error appears in the above-identified patent and that said Letters Patent is hereby corrected as shown below:

Title page,
Item [73], Assignee: change "Rosemont Inc." to -- Rosemount Inc. --

Column 10,
Line 46, insert -- a -- after "and".

Column 11,
Line 16, insert -- , -- after "value".

Signed and Sealed this

First Day of January, 2002

Attest:

Attesting Officer

JAMES E. ROGAN
*Director of the United States Patent and Trademark Office*